(12) United States Patent
Surdin et al.

(10) Patent No.: US 12,513,117 B2
(45) Date of Patent: Dec. 30, 2025

(54) CROSS-REGIONAL INFRASTRUCTURE CONFIGURATIONS FOR DISASTER RECOVERY

(71) Applicant: Amazon Technologies, Inc., Reno, NV (US)

(72) Inventors: Ilya Surdin, Ramat Gan (IL); Ori Pugatzky, Hod Hasharon (IL); Yaniv Ptashnik, Tel Mond (IL); Ron Kimchi, Tel Aviv (IL); Gal Tamir, Petah Tiqwa (IL); Ophir Setter, Ramat-Gan (IL)

(73) Assignee: Amazon Technologies, Inc., Reno, NV (US)

(*) Notice: Subject to any disclaimer, the term of this patent is extended or adjusted under 35 U.S.C. 154(b) by 242 days.

(21) Appl. No.: 18/208,804

(22) Filed: Jun. 12, 2023

(65) Prior Publication Data

US 2024/0414130 A1  Dec. 12, 2024

(51) Int. Cl.
G06F 21/00 (2013.01)
G06Q 50/26 (2012.01)
H04L 9/40 (2022.01)

(52) U.S. Cl.
CPC ....... H04L 63/0272 (2013.01); G06Q 50/265 (2013.01); H04L 63/107 (2013.01)

(58) Field of Classification Search
CPC .. H04L 63/0272; H04L 63/107; G06Q 50/265
See application file for complete search history.

(56) References Cited

U.S. PATENT DOCUMENTS

| | | |
|---|---|---|
| 10,148,493 B1 | 12/2018 | Ennis, Jr. |
| 10,171,292 B1 | 1/2019 | Dolan et al. |
| 11,082,496 B1 | 8/2021 | Chen |
| 11,115,272 B1 | 9/2021 | Kumar |
| 11,216,265 B1 | 1/2022 | Hornbeck |
| 11,582,028 B1 * | 2/2023 | Valkaitis ............... H04L 9/0825 |
| 2017/0078380 A1 | 3/2017 | Aggarwal |
| 2019/0097940 A1 | 3/2019 | Cheng |

(Continued)

FOREIGN PATENT DOCUMENTS

| | | |
|---|---|---|
| EP | 4246332 | 9/2023 |
| WO | 2019113216 | 6/2019 |

OTHER PUBLICATIONS

Non-Final Rejection issued in U.S. Appl. No. 18/208,814, dated Dec. 21, 2023.

(Continued)

*Primary Examiner* — Kendall Dolly
(74) *Attorney, Agent, or Firm* — Hogan Lovells US LLP

(57) ABSTRACT

A system and method for an infrastructure as code (IaC) environment includes automatically generating different infrastructure code for different timepoints based at least in part on changes in infrastructure configurations at the different timepoints of a first virtual private cloud (VPC) so as to execute one of the different infrastructure code for a second VPC to cause deployment of one of the infrastructure configurations; and includes automatically generating or updating a script based at least in part on changes in the infrastructure code, the script to be used to deploy at least a version of the infrastructure configurations with the changes in a second VPC of a different geographical location than associated with the first VPC.

20 Claims, 7 Drawing Sheets

(56) References Cited

U.S. PATENT DOCUMENTS

| | | |
|---|---|---|
| 2020/0028758 A1* | 1/2020 | Tollet .................... H04L 45/02 |
| 2020/0278920 A1 | 9/2020 | Khakare |
| 2021/0314388 A1 | 10/2021 | Zhou |
| 2022/0171667 A1 | 6/2022 | Gilderman |
| 2023/0262369 A1 | 8/2023 | Zheng |
| 2023/0336473 A1 | 10/2023 | Trujillo |

OTHER PUBLICATIONS

International Search Report and Written Opinion issued in PCT Application No. PCT/US2024/030533, mailed Aug. 27, 2024 (15 pages).

Anonymous, "AWS Launch Wizard—User Guide", Sep. 2020, XP093019278, https://web.archive.org/web/2020092218 5202if_/https://docs.aws.amazon.com/launch wizard/latest/userguide/launch-wizard-user-guide.pdf, 62 pages.

Anonymous, Reliability Pillar, "AWS Well-Architected Framework," Feb. 2021, XP093108452, https://docs.aws.amozon.com/wellarchitectured/latest/reliability-pillar/welcome.html, 75 pages.

Berenberg et al., "Deployment Archetypes for Cloud Applications," ACM Comput. Surv. 55, 3, Article 61, Feb. 2022, https://doi.org/10.1145/3498336, 48 pages.

Farnga, "Cloud Security Architecture and Implementation—A practical approach," ARXIV.org, Aug. 2018, XP081552739, 27 pages.

\* cited by examiner

CROSS-REGIONAL INFRASTRUCTURE CONFIGURATIONS FOR DISASTER RECOVERY

BACKGROUND

Customers or administrators of a service provider often rely on specific disaster recovery approaches to provide resilient workloads or applications to their users. In the case of an outage at a geographical location, for example, customers having resources deployed to a geographical location may be forced to wait until the outage is addressed and the resources are back online. A customer would typically prefer to not be affected by such outages and may be provided with the ability to flip resources to another geographical location. To perform such a flip, however, the customer typically has to configure cross-regional infrastructure that presents issues, such as with respect to tooling and abstractions provided by service providers, which may be region-specific. Certain advanced customers capable of deploying cross-region applications have to create solutions to address such issues, which can be costly and complex to develop and deploy, as well as to update over time.

BRIEF DESCRIPTION OF THE DRAWINGS

Embodiments herein will be described with reference to the drawings, in which.

DETAILED DESCRIPTION

Figure 1:
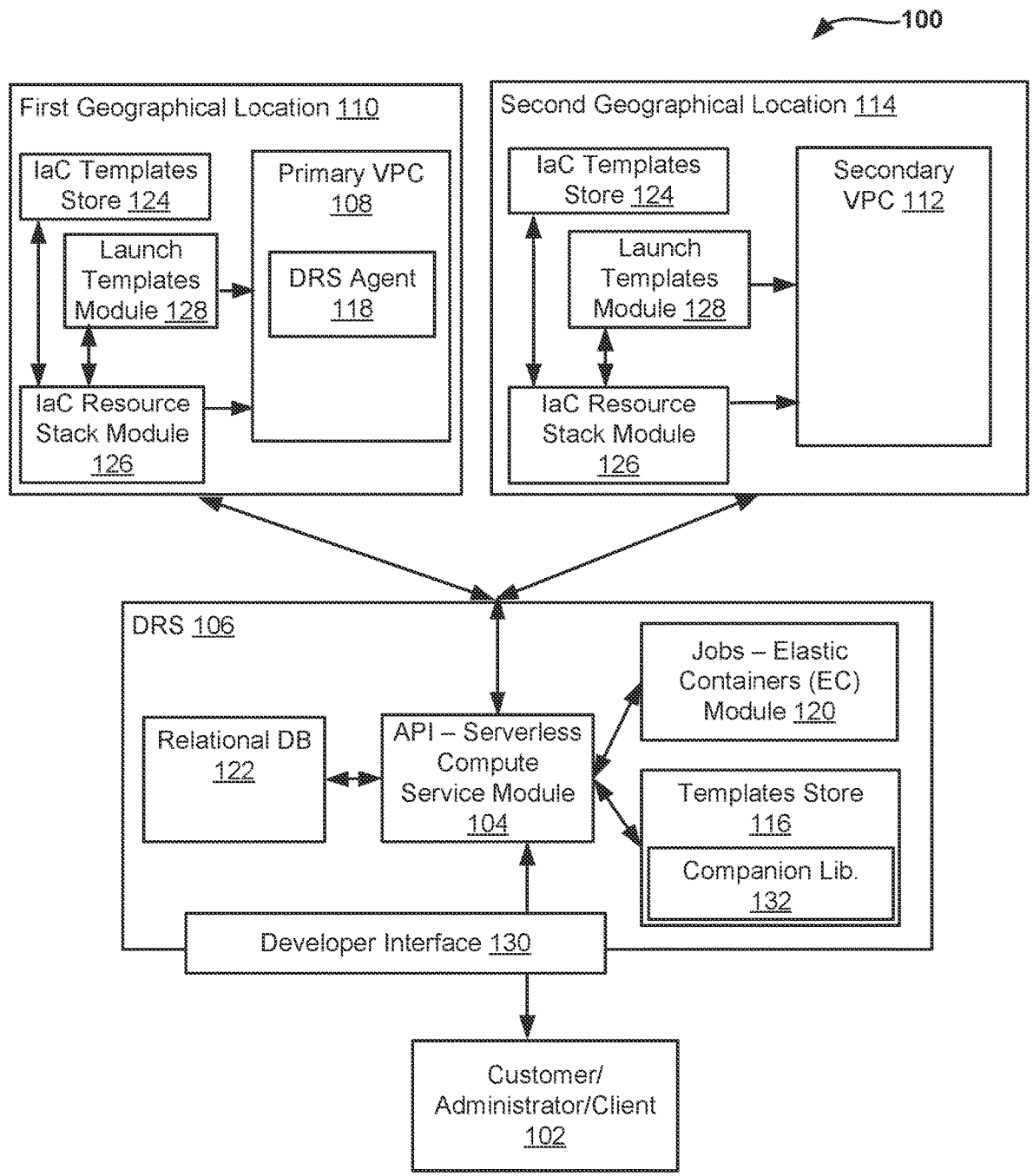
FIG. 1 illustrates a block diagram of a system for cross-regional disaster recovery, in accordance with at least one embodiment.

Systems and methods in accordance with at least one embodiment described herein can overcome one or more of the aforementioned deficiencies, and other such deficiencies, in approaches to disaster recovery using infrastructure code and scripts to provide a system for cross-regional disaster recovery. In at least one embodiment, such a system includes at least one processor to execute instructions from a memory to cause the system to determine infrastructure configurations associated with a first virtual private cloud (VPC) at different timepoints. The system automatically generates different infrastructure code for the different timepoints based at least in part on changes in the infrastructure configurations at the different timepoints. The different infrastructure code may be scoped to or restricted to an application associated with the infrastructure configurations. For disaster recovery, the system can initiate a second VPC that is associated with a different geographical location than the first VPC. The system can execute one of the different infrastructure codes for the second VPC to cause deployment of one of the infrastructure configurations and can perform the application within the second VPC.

Further, in at least one embodiment, the system for disaster recovery described herein includes at least one processor to execute instructions from a memory to cause the system to determine infrastructure configurations to be associated with an application to be deployed in an Infrastructure as Code (IaC) framework or environment. The system is enabled to generate infrastructure code for the infrastructure configurations and can deploy the infrastructure configurations in a first virtual private cloud (VPC) by executing the infrastructure code. In addition, the system automatically generates or updates a script, such as a fail-over infrastructure code or a dedicated fail-over serverless compute function, based at least in part on changes in the infrastructure code. The script is to be used to deploy at least a version of the infrastructure configurations with the changes in a second VPC of a different geographical location than associated with the first VPC.

In at least one embodiment, the infrastructure code and scripts may be part of an Infrastructure as Code (IaC) framework or environment for deploying resilient applications. Therefore, the infrastructure code may be within an IaC template that can be deployed to cause a VPC, followed by deployment of a launch template to cause computing instances within the VPC. A template, as used herein, is one or more of an IaC template or launch template unless otherwise stated. Further, while an IaC template may be deployed to provide an infrastructure configuration for a VPC, the script may not be deployed but may be referenced in an IaC template to reference changes in another IaC template or another infrastructure configuration.

As such, customers or administrators may use high-level code constructs associated with such an IaC framework or environment to build cross-regional applications. While abstractions (such as instances and containers) associated with deployed applications provide customers or administrators with an ability to replicate infrastructure configurations from one geographical location to another geographical location, the infrastructure codes and scripts described herein provide tools to standardize this process. Therefore, even with changes or drift occurring to the infrastructure over time, the present systems and methods allow for standardized performance of applications across geographical locations, in a cost-effective manner.

The standardizing process unifies various building blocks that may be abstractions available within a framework for various applications and for cross-region architectures. An IaC framework described herein includes automatically generated infrastructure codes and scripts to encapsulate these building blocks. The infrastructure codes and scripts are at a higher level of abstraction than the tooling and abstractions that may be region-specific or the solutions created by individual users without access to the underlying relationships of the resources. As a result, instead of having to recognize the requirements and formats of the tooling and abstractions, the infrastructure codes and scripts described herein provide a standard format approach towards managing disaster recovery. While the building blocks may be opinionated by default and allow customers to custom-build to their needs, the infrastructure codes and scripts described herein bring together underlying logic to create the cross-region resources and the necessary backups depending on the resource and configurations described by the customer.

The infrastructure codes and scripts described herein also provide logic required to enable a runtime flip or fail-over to a backup region but are also customizable by the customer. For example, the infrastructure codes and scripts may be generated automatically, but may be customized further to suit the requirements of the customer. The output of the IaC framework or environment is not only cross-regional infrastructure configurations as described in the infrastructure codes but may include disaster recovery automated runbook in the related scripts; and both may be customized based on the configurations set by the customer. Further, infrastructure configuration that may not be part of the IaC framework or environment, include infrastructure configuration for instances to be deployed for a secondary VPC and may be automatically adjusted in the back-up or flip secondary VPC.

In addition, the infrastructure codes and scripts also include client-side companion libraries generated together with the infrastructure codes or scripts. The client-side companion libraries allow for application-aware permissions that may be distinct from regional and account-centric permissions, such as using Identity and Access Management (IAM). For example, using client-side companion libraries, it is possible to create standard format responses to address specific security challenges in cross-regional infrastructure configurations for disaster recovery. The process described herein achieves an active-passive setup to address double resource creations that may occur if auto-scaling is not provided.

Various other functions and advantages are described and suggested below as may be provided in accordance with at least one embodiment herein. In the description herein, at least one embodiment may be described and performed according to the disclosure herein. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates a block diagram 100 of a system for cross-regional disaster recovery, in accordance with at least one embodiment. The system includes at least one processor and memory having instructions that when executed by the at least one processor enables one or more of the modules and the stores 116-128 described herein. A first serverless compute function of a serverless compute service module 104 may be used to cause application programming interfaces (API) calls to one or more other modules of the system or to perform one or more functions of the IaC framework or environment without an API call. In at least one embodiment, the serverless compute service module 104 may be part of a disaster recovery service (DRS) 106. The DRS 106 may be unique to each customer or administrator account and may be accessed by the customer or administrator from a client device 102 using a command line interface (CLI) or a character user interface (GUI). The customer or administrator provides a service or an application for users using one or more of the modules or stores 116-128 of the system described herein.

One or more serverless compute functions can enable API calls to other modules of the DRS 106, such as to a Jobs-Elastic Containers (EC) module 120 and an infrastructure code (IC) templates store 116. For security purposes, an administrator or customer may be associated with a role having permissions to access one or more modules or stores 166-128 using the API calls. The roles may be defined, in part, by a policy of the DRS 106. The customer or administrator on a client device 102 interfaces with a serverless compute service module 104 to cause serverless compute functions therein to perform one or more functions associated with one or more of the modules and the stores 116-128. Alternatively, a scheduling feature of at least one serverless compute function may trigger one or more functions associated with one or more of the modules and the stores 116-128.

In at least one embodiment, one or more of the APIs may be created as part of an endpoint, such as an API endpoint; or may be within an endpoint, such as a Hypertext Transfer Protocol (HTTP) endpoint. A serverless compute function of the serverless compute service module 104 may use the APIs to initiate outbound calls. This allows an API to route HTTP requests on behalf of a serverless compute function for purposes of preparing and providing a primary virtual private cloud (VPC) 108 at a first geographical location 110 that is primary and for purposes of preparing replication, fail-over, flip, or a secondary VPC 112 in a second geographical location 114 that is secondary, for recovery, in the event of an issue in the first geographical location 110 of the primary VPC 108. Further, the DRS 106 may be in a distinct geographical location than the first and the second geographical locations 110, 114.

The servers herein are enabled for replication and may include a DRS installer or agent 118 installed thereon. For example, although illustrated generally in a primary VPC 108, source servers (such as a source server 206 in FIG. 2) enabling the compute instances in the primary VPC 108 may each have installed thereon a respective DRS agent 118. For example, servers of a primary VPC 108 may include different types of server that are subject to different instance types (such as, servers that function as webservers, servers that function as databases, servers that function as frontend servers, and servers that function as application servers). The DRS agent 118 may be pushed for installation from a DRS 106 during a source network creation phase for disaster recovery operations.

Further, a primary VPC 108 may be monitored for changes or performance, such as for flow logs and other metadata that may be sent back to the DRS 106 for storage in a relational database 122. The monitoring may be performed in part by a monitoring service of the primary VPC 108 to capture events and API calls. In at least one embodiment, the monitoring service may be part of the DRS installer or agent 118. Alternatively, or concurrently there with, a second serverless compute function may be provided to operate on a schedule or upon notification to scan for changes in the servers of the primary VPC 108. The changes pertain to infrastructure changes, such as to network configuration, subnet Classless Inter-Domain Routing (CIDR), firewall rules, route tables, Internet gateway configuration, network address translation (NAT) configuration, network access control lists (ACLs), performance characteristics of created volumes associated with the infrastructure configurations of the primary VPC 108, prefix list, and instance resource usage.

In at least one embodiment, the scan for changes may be performed with respect to a template, such as an IaC template, from an IaC template store 124 of the first geographical location 110 and generated for an infrastructure configuration in the primary VPC 108, where the infrastructure configuration is to perform an application. In at least one embodiment, the IaC templates may be generated by an IaC resource stack module 126 of the first geographical location 110 based in part on configuration information in a YAML Ain't Markup Language® (YAML), JSON®, or serverless application model (SAM) template. These templates may be configuration objects and may be provided as transferable files.

An IaC template may include elements of a launch template. However, a launch template may be provided from a Jobs-Elastic Containers (EC) module 120 of the DRS 106. A launch templates may be in the form of a JSON® file and may be updated or newly created and provided within a templates store 116 of the DRS 106. A launch template module 128 may receive and provide the launch template to cause deployment of instances within the primary VPC 108. Then, monitoring, as provided to the IaC templates may include monitoring for changes in the infrastructure configuration that includes changes to the instances. In at least one embodiment, the launch template can be updated by automatically adjusting the at least one instance attribute of the launch template based in part on at least one of the different infrastructure code generated for a timepoint and to be deployed to provide the computing instances within the secondary VPC 112. For example, volume types or association to one or more security groups may be adjusted for a computing instance prior to deployment within the secondary VPC 112.

Like in the case of changes in the primary VPC 108, changes in the instances of an infrastructure configuration in the primary VPC 108 may be monitored using the infrastructure configuration itself or using the launch templates. For example, a DRS installer or agent 118 may be used to monitor the changes, such as by tracking API calls. At least one serverless compute function can retrieve or scan a launch template from the templates store 116. Separately, the launch template may be a default launch template that is adjusted automatically according to the changes made in the IaC template once the secondary VPC is deployed without the need to replicate the launch template from the first geographical location 110.

Further, a serverless compute function may be provided to operate on a schedule to scan for replicating servers. The serverless compute function can enable one or more underlying servers within the DRS 106 to be tagged with an associated prefix of the JSON® file. For example, a template property may include providing a tag to a deployed resource of the infrastructure configuration of a primary VPC 108. The scanning for changes may therefore be performed for all servers having specific tags. A matching of a tag associated with a JSON® prefix, representing a template from the templates store 116, allows servers associated with the primary VPC 108 to be grouped under a recovery requiring the same launch template. For example, tagging of network resources can be performed, in part by the execution of the IaC template to map a primary VPC's resources to a secondary VPC's resources. This supports or allows updates of instance attributes of a secondary VPC's launch templates to allow intended network placement and network security settings of recovered servers on the secondary VPC.

Still further, the servers having the DRS agent 118, in a primary VPC 108, may be part of a group once they are tagged as being part of a same application or same infrastructure type and therefore have a same launch template. For example, servers of a primary VPC 108 may be tagged as a type of server subject to a specific instance type (such as, servers that function as webservers, servers that function as databases, servers that function as frontend servers, and servers that function as application servers). In at least one embodiment, all the servers tagged with a specific tag may be updated when a template associated with the server (such as sharing a name or other prefix), is loaded to the templates store 116, which indicates that an IaC resource stack module 126 has generated a new stack, has updated an existing stack, has generated a new template, or has updated an existing template.

In addition, as a serverless compute function enables tagging of the servers using a provided or default tag, all servers under the update may also have their underlying templates updated based in part on an update to one of the servers. In at least one embodiment, the templates may be edited to change their fields and to change their names and one or more of the edited templates may be used be used as a custom or updated template for certain infrastructure configurations, for instance.

The serverless compute function provided to operate on a schedule or upon notification to scan for changes in the servers may also be enabled to trigger upon a change determined in a specific template in a templates store 116 that is associated with the first geographical location 110. The change may also include a change in the templates store 116, such as, by addition of a new template to the templates store 116. Alternatively, the trigger may be caused upon a change in a route table or upon a request from an API, such as of another serverless compute function. All such aspects of determining that a change has occurred may be part of a replication phase for disaster recovery operations. For example, the changes may be reflected in a template and may be replicated over to the templates store 116, along with a timestamp having a timepoint of when the changes occurred.

The templates are stored as files or documents with a history of changes at various points in time using the timestamp. In a recovery phase, it is possible to recover previous infrastructure configurations of infrastructure associated with the primary VPC 108, such as a network configuration. The document or file includes infrastructure code and can be replicated to a safe geographical location or to a secondary geographical location for a customer or administrator to edit, keep, or use in deploying in a back-up or flip to the second geographical location 114 upon an event occurring in the first geographical location 110. For example, when disaster strikes in a first geographical location 110, the DRS 106 will create a copy of the file or document (or will use a copy of the file or document already received to it) to recover the infrastructure configuration in a second geographical location 114. In at least one embodiment, other than the network configuration, instance attributes, such as security groups, volume types and other aspects that are not part of an IaC template or that may be partly included with an IaC template and may be automatically adjusted to match those of the source primary VPC 108.

In at least one embodiment, at least one server compute function may be used to trigger automatic generation of different infrastructure code, reflected in the changes in a template, for the different timepoints, based at least in part on changes in the infrastructure configurations at the different timepoints. For example, the replication over the templates store 116 may be performed by automatic generation of a template using the template providing the infrastructure configuration of the primary VPC 108. The automatic generation provides a template that may include changed fields to reflect the changes in the primary VPC 108. The template may be an IaC template and may include launch template aspects as well.

In at least one embodiment, all the servers tagged with a specific tag may be updated when a template associated with the server (such as sharing a name or other prefix), is uploaded to the templates store 116. In addition, as a serverless compute function enables tagging of the servers using a provided or default tag, all servers under the update may also have their underlying templates updated based in part on an update to one of the servers. In at least one embodiment, the templates may be edited to change their fields and to change their names and one or more of the edited templates may be used be used as a custom template for certain infrastructure configurations, for instance.

In the event of a failure or in the event fail-over or a flip to be performed via the DRS 106, launch templates may be provided from the templates store 116 to the launch template module 128 of the second geographical location 114. Further, IaC templates may be replicated from the templates store 116 using the IaC resource stack module 126 or may be replicated to the IaC template store 124 of the second geographical location 114. For example, based in part on a template in the templates store 116 of the DRS 106, the IaC resource stack module 126 may cause automatic generation of different infrastructure code for the different timepoints based at least in part on changes to the template to reflect changes in the infrastructure configurations in the primary VPC 108. The changes at the different timepoints allow a customer or administrator to provide a selection or to indicate prior to the failure, fail-over, or flip, as to what timepoint to deploy the templates. All such aspects may be part of a recovery phase for disaster recovery operations.

The system in FIG. 1 enables a customer or administrator on a client device 100 to provide an active-active solution in disaster recovery. The active-active solution pertains to abilities in a system to accept traffic in multiple geographical locations. For example, the customer or administrator may wish to leverage a cross-regional approach to mitigate downtime effects of disaster recovery. The system in FIG. 1 described herein may be used to address the needs of such a customer or administrator without a requirement to wait for disruptions to pass, as a recovery strategy. For example, using the recovery phase with the replication phase, it is possible to increase availability of resources by control features and to secure credentials related to applications and their underlying resources in different geographical locations. This allows for better rollback monitoring of application pipelines, better alarming on application services, and provides more than only resilience during service disruptions.

Figure 2:
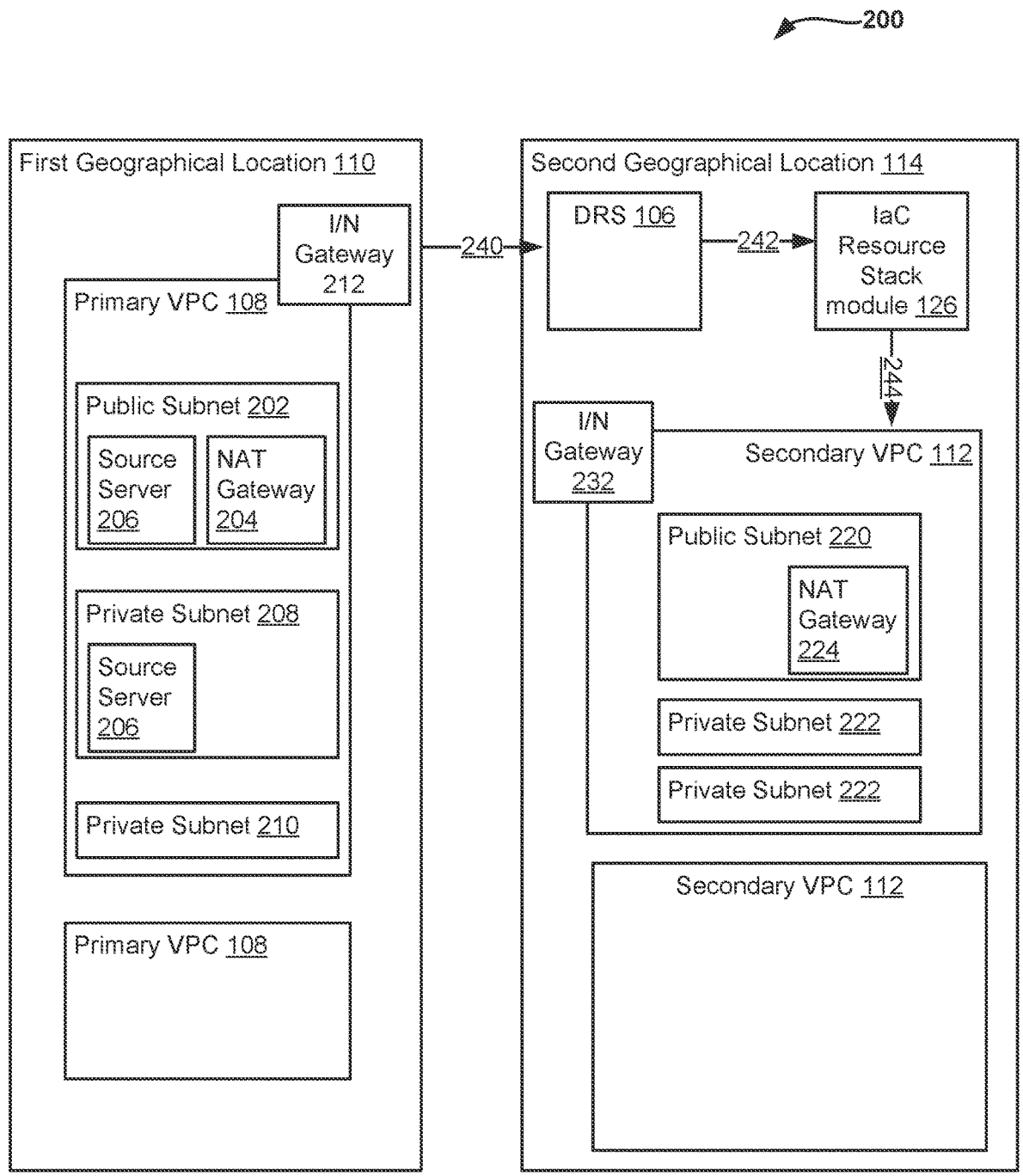
FIG. 2 illustrates a block diagram of subnet details in a system for cross-regional disaster recovery, in accordance with at least one embodiment.

FIG. 2 illustrates a block diagram 200 of subnet details in a system for cross-regional disaster recovery, in accordance with at least one embodiment. The primary and secondary VPCs 108, 112 may be a virtual environment to launch resources, such as computing instances, in a logically isolated virtual network. The logically isolated virtual network includes benefits of using underlying scalable infrastructure, such as servers, of the first and second geographical locations 110, 114. In at least one embodiment, a primary or secondary VPC 108; 112 may include private or public subnets 208, 210, 220, 222 based in part on a customer or administrator's request. A private or public subnet 208; 210; 220; 222 includes a range of Internet protocol (IP) addresses that are within a VPC. Further, a private or public subnet 208; 210; 220; 222 may include the computing instances, but may be provided within a single zone, where multiple private or public subnets 208, 210, 220, 222 of a VPC are each separated by zone boundaries.

In at least one embodiment, IP addressing is provided for the primary and secondary VPCs 108, 112 and may be performed using assigned IP addresses that are either IPv4 or IPv6 and that apply to the VPCs and to its subnets. As indicated in FIG. 2, a public subnet 208; 220 may be subject to public IPv4 and IPv6 addresses. The IP addresses are then allocated to respective resources within the VPC, such as to the computing instances, to network address translation (NAT) gateways 204; 224, and to load balancers. Further, routing within the VPCs uses route tables to determine where network traffic from one subnet or a gateway should be directed.

In at least one embodiment, gateways and endpoints may be provided for the primary and secondary VPCs 108, 112, where a gateway 212, 232 couples a VPC to another network, such as a private network. In at least one embodiment, a gateway 212 may be used to couple a VPC to the Internet (I/N). An endpoint, with respect to a VPC, can be used to couple services to the VPC privately, instead of using the Internet. Further, traffic between the primary and secondary VPCs 108, 112 may be provided via a peering connection using private IPv4 or IPv6 addresses. For example, computing instances of the primary and secondary VPCs 108, 112 may be enabled to communicate with each other between VPCs of a same customer or administrator or of different customers or administrator and also between first and second geographical locations 110, 114.

A peering connection can enable file sharing or resource sharing between computing instances of the primary and secondary VPCs 108, 112. When across first and second geographical locations 110, 114, peering connections allow resources within each VPC to communicate with each other using private IP addresses and without a need for a gateway, a virtual private network (VPN), or other physical or virtual network appliance. Further, traffic through such primary and secondary VPCs 108, 112 of first and second geographical locations 110, 114 remains private. In at least one embodiment, traffic between the first and second geographical locations 110, 114 may be encrypted and may be provided within a resource provider backbone, and without access via the Internet.

In at least one embodiment, a transit gateway may be used to route traffic between primary and secondary VPCs 108, 112, as well as between the primary and secondary VPCs 108, 112 and other virtual and direct connections. The transit gateway may include at least one processor and memory having instructions that when executed by the at least one processor is able to perform routing of traffic based at least in part in routing tables provided therein. For example, using peering connection with a transit gateway allows a customer or an administrator to create multiple route tables representing segments of networks within the transit gateway. The routing tables may be associated with respective VPCs, with VPNs, and with other physical or virtual network appliances. As such, the networks created using such approaches allow for isolation by providing private networks to resemble virtual routing and forwarding (VRFs) in established network protocols.

In at least one embodiment, infrastructure configurations associated with an application that is to be deployed in an Infrastructure as Code (IaC) framework or environment is determined based in part on tags and instances deployed within a primary or secondary VPC 108, 112. The IaC environment allows generation of infrastructure code that is a high-level computer language or other descriptive language and that is used to manage and automate infrastructure deployments associated with one or more primary and secondary VPCs 108, 112. Separately, while infrastructure code is directed to management and automation of a VPC infrastructure, a script, for purposes described herein, can be used to deploy infrastructure configurations based in part on changes in the infrastructure code and apply to computing instance infrastructure deployed for the VPC. For example, the script may include a dedicated fail-over infrastructure code or fail-over serverless compute function that generates a clickable button (for a GUI) to cause a flip from one geographical location to another. In at least one embodiment, infrastructure code can be generated from a default IaC template, but can include aspects of a launch template, and can be used to create a computing instance within a primary or secondary VPC 108, 112.

In at least one embodiment, when a change is caused to relevant infrastructure, such as to one or more resources (including to the computing instance), within a primary or secondary VPC 108, 112 or to the VPC itself, the change may be reflected in a code that is part of the template, whereas a change itself having occurred may be recorded in the script, based in part on monitoring changes in related infrastructure code. As such, the script can be automatically generated or updated based at least in part on changes in the infrastructure code or changes to the infrastructure itself.

For example, a YAML®, JSON®, or other configuration object tracks configuration changes associated with the infrastructure, including in the infrastructure code corresponding to the infrastructure. However, other types of serialization-related configuration objects may be used here with. The tracking in the configuration object may be based in part on captured or monitored information from the DRS installer or agent 118. A separate template code, such as a Jinja® or other templating code, may be used to consume the configuration object to provide an IaC template for deploying in the first geographical location 110. The configuration object and the templating code may be stored in the DB 122 and may be loaded in a Python® script to automatically generate the IaC template. The IaC template may be automatically generated upon changes to the configuration object, such as by the configuration object returned to the DRS 106 and particularly to a location of the DB 122 or the template store 116, which is accessible to an API of the serverless compute service module 104 to cause the automatic generation to occur. In at least one embodiment, a compiler associated with the IaC resource stack module 126 may compile the YAML®, JSON®, or other configuration object with the template code upon changes to the configuration object to provide the IaC template.

Therefore, changes to the configuration object may be provided at different timepoints result in automatically generated IaC templates for the different timepoints. Then, it is possible to initiate a secondary VPC 112 that is associated with a different geographical location 114 than the primary VPC 108 using the IaC template for one of the different timepoints. For example, a disaster or other event may cause the initiation and will allow execution of one of the different infrastructure code, such as in one IaC template of a timepoint, for the secondary VPC 112, to cause deployment of one of the infrastructure configurations. Further, a launch template associated with a computing instance in the primary VPC 108 may be used with the secondary VPC 112 but with adjustments to the configuration of the secondary VPC 112. This may be required if the IaC template for the secondary VPC 112 is deployed with changes or from a different timepoint than when the disaster or event occurred.

Separately, when the IaC template is provided for a first VPC 108, a script may be used to provide a dedicated fail-over infrastructure code or fail-over serverless compute function that tracks the changes to the IaC template over different timepoints. For example, based in part on monitoring or capturing of changes that is enabled in part by a DRS installer or agent 118, a YAML®, JSON®, or other script of structured changes is automatically generated or updated. In an example, the script may be provided in the DB 122 or in the templates store 124. The script is therefore based at least in part on changes in the infrastructure configuration, as deployed, and as determined by the DRS agent 118 over different timepoints, is based in part on changes in an infrastructure code of the IaC template over different timepoints, or is based in part on notifications from the Primary VPC 108 over different timepoints. The script can be used to deploy at least a version of the infrastructure configurations with the changes in a secondary VPC 112 of a different geographical location 114 than associated with the primary VPC 108. For example, upon a disaster or other event, the script may be loaded to a configuration object and may be compiled to provide an IaC template for the secondary VPC 112.

In at least one embodiment, as described in connection with FIG. 1, the infrastructure code may be generated based in part on a template stored within a DRS 106. The template can include one or more of an IaC template or a launch template. In FIG. 2, the DRS is illustrated within the second geographical location 114 providing the recovery. In at least one embodiment, a templates store 116, within the DRS 106, stores the IaC templates that is may be one type of the templates described herein. An IaC template may be used to replicate infrastructure created as part of a primary or secondary VPC 108, 112, for instance. Separately, launch templates that may be stored in the templates store 116 are part of the infrastructure code that, when processed within a primary VPC 108, causes deployment of resources described in the infrastructure code, within the VPC.

In at least one embodiment, each template described herein may include launch template parameters, such as for one or more of a subnet, security grouping, type of instance, access profile, public IP, tenancy, key-pair or other security credentials, and tag to categorize instances based in part on the key-pair. The subnet filed specifies a public or private subnet 202, 220, 208, 222 in which a computing instance is to be launched, otherwise a computing instance may be launched in a default subnet of a default VPC of a specific geographical location. For a default VPC, the template may be modified to define a subnet. The security grouping may pertain to assigned groups for a computing instance that is launched within a VPC. For example, the security groups may be applied to a subnet selected for a network interface. The type of instance allows the DRS 106 to determine a sizing of the computing instance to launch and to provide auto scaling for the computing instance.

Further, the access profile of the template may be an Identity and Access Management (IAM) profile to be attached to the computing instance once it is launched. The IAM profile brings in any polices associated therewith to be further associated with the computing instance. The public IP is assigned to allow access to the computing instance. A tenancy parameter provides tenancy information, including the host information to licensing of certain third-party services. A credential, such as a key pair may be associated with the computing instance after launch and may be used with the tags to provide categorizing. For example, the tags can indicate an owner of a computing instance and can indicate a stack to which the computing instance belongs.

In at least one embodiment, FIG. 2 further illustrates that, interfacing between a primary VPC and a secondary VPC 108, 112 of provided geographical locations 110, 114 (which may alternatively correspond to availability zones) may be performed using an API interface of the serverless compute service module 104 that includes the APIs to make API calls from the DRS 106 to create a source network of the primary VPC 108 using a DRS agent 118 of the primary VPC 108. For example, serverless compute functions of the serverless compute service module 104 can cause the API calls from available APIs to the primary VPC 108. The serverless compute functions are also able to cause API calls to the Jobs-Elastic Containers (EC) module 120 and to a relational database (DB) 122 to store information, such as metadata associated with the source network as it is created. Further, the APIs to create the source network and to communicate with the EC module 120 and the DB 122 may require appropriate permissions that may be granted to the customer or administrator on a client device 102 as part of its administrator role provided by an IAM policy.

In at least one embodiment, the coupling between the DRS 106 and a primary VPC 108 may be a private network, via private subnets 208, 222, without the need for traffic to go through the Internet. As the VPC is initiated with network settings, including an IP address range, subnets, route tables, and network gateways, a routing of control traffic based in part on the API calls between the primary VPC 108 and DRS 106 can be handled by the private network, and IAM policies can be used to control access to the EC module 120, DB 122, and other resources. In at least one embodiment, a VPC endpoint may be defined to enable the DRS 106 to communicate with the primary VPC 108 via the private network. The VPC endpoint includes a private IP address to receive and provide traffic as associated with a service operating in the primary VPC 108.

Further, the VPC endpoint may be also used to allow communication between a primary VPC 108 and an templates store 116. The VPC endpoint is a gateway endpoint to enable the private network. However, access to a service of the DRS 106, such as the templates store 116, from a premises outside the VPC may use an interface endpoint within the VPC, with a VPN connection through the Internet to reach the primary VPC 108. Still further, a subnet of the primary VPC 108 may communicate with the templates store 116 using the interface endpoint within the primary VPC 108, as well. One or more of such approaches may be used to support a private DNS.

In at least one embodiment, in the replication phase, a primary VPC 108 may require the DRS agent 118 (which may alternatively be referred to as a DRS installer) to be installed to enable disaster recovery and communication through an endpoint. The communication 240 may be to scan or read the infrastructure configurations of a VPC, such as the primary VPC 108. A VPC may download the DRS agent 118 to a compute instance or to run within the primary VPC 108. For example, a DRS agent 118 is an agent installer of the primary VPC 108. The DRS agent 118 is in network access with the DRS 106 through an appropriate interface or gateway endpoint to enable the scanning or reading of the communication 240, for replication, of the infrastructure configurations of the primary VPC 108 into a templates store 116 of the DRS 106. For example, the scanning or reading of the communication 240 may indicate a change in the infrastructure configurations of the primary VPC 108. A serverless compute service of the DRS 106 enables automatic generation of an IaC template for the templates store 116 based on the change. With the source network of the primary VPC 108 created, replication may be performed using the EC module 120 for the launch templates, in addition to the IaC template of the templates store 116. Further, a DRS 106 can scan the primary VPC 108 using the APIs of the serverless compute service module 104 without a DRS agent 118.

In at least one embodiment, in a recovery phase, templates that are automatically generated to incorporate the change in the primary VPC 108 and that are previously stored in the templates stores 116 of the DRS 106 may be communicated 242 for deployment via the IaC resource stack module 126 of the second geographical location 114. This allows deployment of infrastructure for a second VPC 112. The templates that are automatically generated by an EC module 120 may enable changes in the instances based in part on tagging of network resources done as part of the IaC template to map a primary VPC's resources to a secondary VPC's resources. For example, the changes also allow or support updates of a secondary VPC's launch templates to allow correct network placement and network security settings of recovered servers on the secondary VPC. The placement may include placement of resources in the public and private subnets 202, 210 from the primary VPC 108 and may be communicated 242, as well, to be part of the launch template module 128 of the second geographical location 114. This allows deployment of public and private subnets 220, 222 for instances and other resources within the secondary VPC 112. In at least one embodiment, there may be a distinct secondary VPC 112 in each first and second geographical locations 110, 114 that may be subject to separate or joint disaster recovery using the same automatic generation of infrastructure codes and scripts.

The IaC templates may include asynchronously copied objects from the templates store 116 of the DRS 106. In at least one embodiment, if the secondary VPC 112 is operating continuously as a backup, the asynchronous copy, for replication, may be performed continuously. At the same time, versioning for the provided templates allow selection of a restoration point. In at least one embodiment, an IaC resource stack module 126 provides IaC templates or supports modified resource templates provided from the DRS 106 to enable the secondary VPC 112. These IaC templates describe the resources and their properties for the VPC, as backed-up from the primary VPC 108. When the resource template is used to create a stack, auto scaling is supported, along with a load balancing aspects and a database. In at least one embodiment, the resource template sets up a secondary VPC 112 that can include public and private subnets 220, 222, as was in the primary VPC 108 (as in, reference numerals 202, 210). Further, the secondary VPC 112 may be set up to include availability zones as previously in the primary VPC 108. The resource template can also provision IAM aspects for the customers or administrators to enable the DRS agent 118 for the recovery phase. In at least one embodiment, the private subnets 222, as set up in the secondary VPC 112, may include outbound Internet access via a NAT Gateway 224 of a public subnet 220.

In at least one embodiment, the templates described herein include automatically generated infrastructure code to enable a transit gateway to be created in the secondary VPC 112 with the transit gateway configuration of the primary VPC 108. Then, a public and private subnet 220-222 may be selected to be used with the transit gateway to route traffic for the secondary VPC 112. Further, in at least one embodiment, route tables to provide routes containing private IP addresses of the primary VPC 108 may be also provided to the secondary VPC 112. The route tables may indicate the secondary VPC 112 as the target instead of the primary VPC 108 for traffic after fail-over or may indicate a shared transit gateway as the target for the route to enable redundancy. Further, networking and security details may be transferred in a similar manner from the primary VPC 108 to the secondary VPC 112.

In a similar manner, the launch templates module 128 provides launch templates or supports modified launch templates form the DRS 106 to enable a computing instance that was configured in the primary VPC 108. For example, a launch template includes parameters required to launch a computing instance, such as parameters for an identifier (ID) of a Machine Image (MI) and an instance type, security group, and subnet. Further, a launch template provides full functionality for the auto scaling supported by the resource templates. In at least one embodiment, MI ID numbers may change over time as well as change across different geographical locations, the infrastructure code and the scripts described herein address these changes by continuously monitoring infrastructure code changes and updating the script for at least deploying the resource and launch templates in the secondary VPC 112.

To know which role to assume and which account to access, a customer or administrator must know which geographical location is currently "active." This is so that traffic relating to reads and/or writes have the required credentials for that region. In at least one embodiment, information including such credentials can be packaged in the client-side companion library which is a build artifact of the IaC framework or environment described herein. In at least one embodiment, a client-side companion library will be able to determine which geographical location is a primary geographical location based at least in part on a contract for the disaster recovery. The client-side companion library is configured to return a specific credential for a specific geographical location so that the traffic may include such a credential to indicate the active geographical location without a need for intervention.

In at least one embodiment, the specific credential may be associated with parameter tables and routing tables to be used with respective ones of the multiple geographical locations. For example, a parameter table may be part of a parameter store for configuration variables associated with specific geographical locations and correlated to plaintext or encrypted secure strings. Further, a routing table may include zone information and routing controls (using policies) to provide traffic routes for multiple geographical locations. In application, a first credential may be part of a parameter table and may be tied to a routing (and policy) in the routing table so that an application running on primary VPC of a primary geographical location routes traffic using the specific credential. A second credential, stored and related in the same manner as the first credential, may be tied to the application (as part of redundancy or fail-over) that is to be run (as fail-over) or that is running (as redundancy) on a secondary VPC of a secondary geographical location.

The IaC framework or environment described herein can also address resource creation in a customer account using an application programming interface (API) call using an existing stack (or set of resources). For example, such an API-approach allows auto-generation of infrastructure in a secondary region but requires an in-depth understanding of customers' applications, including their code to access resources and related interdependencies associated there between. In addition, after resources are created in the API-approach, there may be a drift away from at least an initial setting and there may not be a procedure to keep the initial settings current. For example, the infrastructure at a primary region may be created using IaC, but the infrastructure in the secondary region may be created using replication and not using IaC. As such, a drift may not be applied to the secondary region during a flip or a fail-over.

In at least one embodiment, an administrator or customer may use the IaC framework to build their applications. The IaC framework includes building blocks of abstractions that are scoped to an application (rather than a region or account). These abstractions are configured by the administrator or customer to enable customizations on both the resources and the recovery mechanism, by enabling automatic generation of infrastructure code within a template that is further customizable by the administrator or customer. Infrastructure configurations can depend on cross-region orchestration that is available for the given resource. For example, certain applications of the IaC framework will be able to be configured as either "Global" or "BackupAndRecover." When the administrator or customer deploys the template for such applications, resources are created across multiple regions and interact in a way that the configured by the administrator or customer. The output of the deployment also includes a script that can perform the flip to the secondary region when required. For example, when the administrator or customer wishes to perform a runtime flip (for fail-over), the administrator or customer executes the script and the applications of the primary geographical location are recovered in the secondary geographical location.

The infrastructure configurations in the template to be replicated across geographical locations may include network configuration, subnet Classless Inter-Domain Routing (CIDR), firewall rules, route tables, Internet gateway configuration, network address translation (NAT) configuration, network access control lists (ACLs), performance characteristics of created volumes associated with the infrastructure configurations of the first VPC, and instance resource usage. Further, the infrastructure configurations may be provided using physical infrastructure, such as a source server 206 of an on-premises location functioning as a first geographical location 110.

Based in part on a requirement to move the infrastructure configurations to the different geographical location, such as a second geographical location 114, because of a disaster or other hazard in the first geographical location 110, a script may be used to cause the initiation of the secondary VPC 112 at the second geographical location 114. For example, the script may be a serverless compute function of the DRS 106 to trigger a recovery phase for the infrastructure configuration of a primary VPC 108, based in part on the requirement to move the infrastructure configurations.

At least during regular operations and a replication phase, a replication serverless compute function of the DRS 106 performs scanning of the infrastructure configurations in the primary VPC 108 for the changes. A change determined in the primary VPC 108 can trigger an automatic generation of different infrastructure code to provide IaC files or templates to be retained in a reserve geographical location. However, the templates may be provided to a DRS 106 in the second geographical location 114. The reserve geographical location may be different than the second geographical location 114 of the secondary VPC 112 or a first geographical location 110 of the primary VPC 108.

In at least one embodiment, automatic generation of a first infrastructure code occurs upon deployment of the first VPC having the infrastructure configurations or based on an agent installed in the first VPC. For example, the installation of the agent causes automatic generation of the first infrastructure code. Alternatively, the agent, after installation, performs a scan and notifies or supports generation of the first infrastructure code by the DRS 106. In an example, the first infrastructure code is based in part on a default template or customized template that is copied over as an automated process reflecting the automatic generation of the first infrastructure code. Changes in the infrastructure configuration may be determined based in part on a notification received to a DRS 106 that retains the first infrastructure code. Then the automatic generation is applicable to the different infrastructure code. For example, the automatic generation includes applying at least one of the changes to the first infrastructure code to provide the different infrastructure code for a timepoint associated with the changes. This may be a continuous process for different timepoints.

In at least one embodiment, an administrator or customer can access a DRS 106 and the underlying different infrastructure code of the different timepoints. For example, a CLI or GUI may be used to access the DRS 106. Then, the administrator or customer can make changes to at least one of the different infrastructure code, as a customization option prior to a flip or fail-over being conducted. With the customization complete, one of the different infrastructure code that is subject to the customization may be executed, for the second VPC, with the administrator changes applied.

A CLI or GUI of the DRS 106 allows an administrator selection of one of the different infrastructure code based in part on one of the different timepoints to be part of the flip or fail-over. Separate, the CLI or GUI may be used by the administrator for selection of at least one of the different infrastructure code based in part on one of the infrastructure configurations of one of the different timepoints. In at least one embodiment, the CLI or GUI may be used to allow administrator selection of one or more of the different infrastructure code, which causes exporting of the selection of the one or more of the different infrastructure code, as a file, to a client device for storage, edit, or deployment to the second VPC.

A disaster in a primary geographical location may be determined as being associated with a primary VPC 108. The DRS 106 is enabled to create a copy of at least one instance attribute that is outside a scope of the infrastructure configurations associated with the primary VPC 108. For example, the instance attribute may be to a type of the instance operating in the primary VPC 108. At least one of the different infrastructure code may be retrieved by the DRS 106, for the secondary VPC 112. Automatic adjustments may be performed for at least one of the different infrastructure code, based in part on the at least one instance attribute prior to causing the deployment of the one of the infrastructure configurations for the secondary VPC 112. This allows for replication of only the IaC template, whereas the computing instances are newly provided in the second geographical location, barring changes to be made to the computing instances to allow them to work with the infrastructure configuration replicated to the second geographical location. In one example, at least one instance attribute is associated with security groups or volume types to be used with the one of the infrastructure configurations.

In at least one embodiment, the DRS 106 includes serverless compute functions capable of determining infrastructure configurations that change, based in part on scanning or monitoring IaC templates or launch templates but may also monitor change logs and metadata associated with infrastructure configurations of the source servers and other components deployed in the first geographical location 110.

The primary VPC 108 in the first geographical location 110 is associated with an application to be deployed using the IaC framework or environment, such as requiring deployment using IaC resource stack module 126 to perform compiling and to allow execution of underlying YAML® or JSON® files.

Infrastructure code may be generated by the IaC resource stack module 126 for the infrastructure configurations to be deployed with a first virtual private cloud (VPC). Separately, serverless compute function of the serverless compute service module 104 may be used to cause automatic generation of the infrastructure code, such as by replication a default template with changes applied therein. Further, a script, such as a dedicated fail-over infrastructure code or fail-over serverless compute function may be automatically generated or updated based at least in part on changes in the infrastructure code under the scanning or monitoring performed herein. The script can be used to deploy a version of the infrastructure configurations with the changes in a second VPC of a different geographical location than associated with the first VPC. For example, the script generates a button in the GUI of the DRS 106 to enable the fail-over or flip to the second geographical location.

In at least one embodiment, the infrastructure configurations may include fail-over ordering. Further, the script that is automatically generated or updated may include a version of the fail-over ordering. In one example, application code for an application in the primary VPC 108 may be performed by an infrastructure configuration. Changes to the infrastructure configuration may be represented as different infrastructure configurations of the infrastructure code, but that are all restricted to perform the application. In one example, the restriction is by allowing deployment of an application using a source server 206 that exclusively performs the application within a primary VPC 108.

Therefore, a template of infrastructure code is associated with different infrastructure configurations and may be used with the application. Customizations to the template may be provided by an administrator or customer in addition to any automatic generation to provide further infrastructure code. The customizations may change resources and recovery mechanisms associated with the infrastructure configurations of the primary VPC 108.

In at least one embodiment, a client-side companion library 132 may be generated along with the infrastructure code by an IaC resource stack module 126. The client-side companion library 132 is an artifact of the IaC resource stack module 126 and can include at least a definition that is associated with a primary geographical location that comprises physical resources for the first VPC. The definition may include at least a security parameter defining security to be associated with configuration variables and traffic for the first VPC. The definition may also include at least a scalable domain name system (DNS) for the first VPC.

In at least one embodiment, the DRS 106 may include ability to determine a first security credential for the first VPC from the definition. The first security credential may be associated with the primary geographical location. The DRS 106 supports deployment of the infrastructure configurations in the primary VPC 108 by executing the infrastructure code to select from the physical resources of the primary geographical location using the security credential. Then, a script, such as a dedicated fail-over serverless compute function may be used to perform fail-over changes from the primary VPC 108 to the secondary VPC 112 of the different geographical location. Further, a version of the infrastructure configurations in the second VPC uses a different security credential than the first security credential. This allows for traffic to be differentiated from different regions without compromising the fail-over process.

In at least one embodiment, the script may also initialize, as part of a fail-over from a primary geographical location to the different geographical location, a parameter table and a routing table to be replicated and located in the different geographical location. In at least one embodiment, the parameter table may be used to cause the version of the infrastructure configurations to be deployed with the secondary VPC 112 of the different geographical location. In addition, the routing table enables traffic previously received to the primary VPC 108 to be routed in the secondary VPC 112. The traffic includes the security credentials associated with the second VPC upon completion of the fail-over. The security credentials may be generated in part from a version of the infrastructure code executed in the second VPC.

As part of the script being generated from the DRS 106, at least one parameter table and at least one routing table may be also generated to be used with the second VPC of the different geographical location. Alternatively, as part of the script, an order of multiple geographical locations for the second VPC may be also generated, along with associated parameter tables and routing tables to be used with respective ones of the multiple geographical locations.

Figure 3:
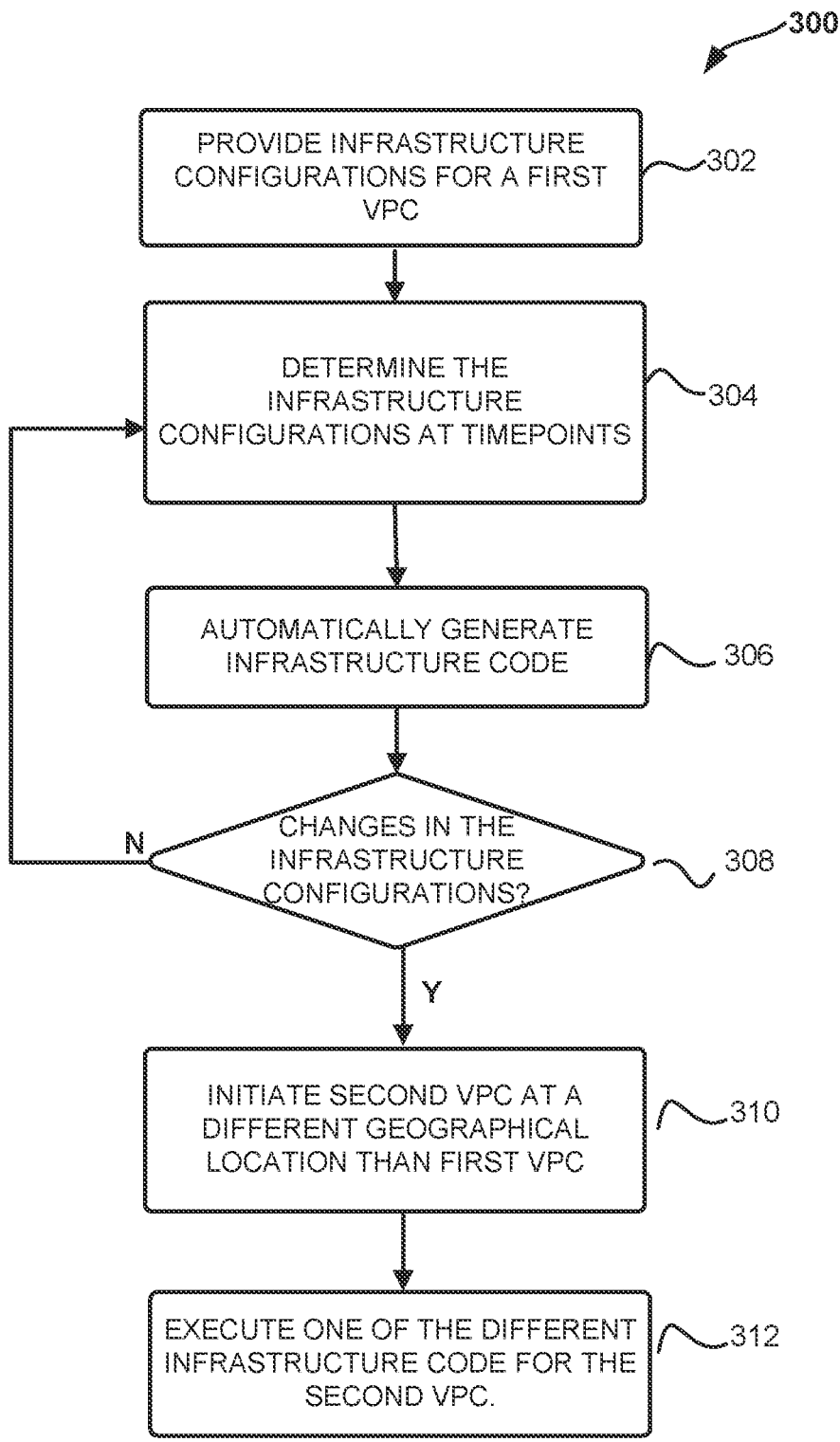
FIG. 3 illustrates a process flow or method used for a system for cross-regional disaster recovery, in accordance with at least one embodiment.

FIG. 3 illustrates a process flow or method 300 used for a system for cross-regional disaster recovery, in accordance with at least one embodiment. One or more steps in the method 300 may be performed on a client device or using a client device together with a cloud environment that is remote from the client device, as illustrated and described with respect to FIGS. 5-7. The method 300 includes providing (302) infrastructure configurations for a first VPC. This may be by using a default IaC template or generating a customized IaC template, from a default template using an editing tool that is a CLI or GUI, such as using an IaC resource stack module. The template may be a YAML® or JSON® format file or document that may be compiled in an appropriate YAML® or JSON® compiler of the IaC environment, prior to execution in the IaC environment to cause underlying servers to be provided for deploying the first VPC. However, in at least one embodiment, default or first IaC template may be an outcome of an infrastructure scan, enabled by a DRS agent or by a serverless compute function of the DRS, of the primary VPC.

The method 300 includes scanning and reading infrastructure configurations over periods of timepoints to determine (304) infrastructure configurations associated with an application to be deployed using the IaC framework or environment. The scanning and reading occur over the timepoints and may be associated with any changes that may occur over the timepoints. The method 300 includes verifying (308) that changes have occurred. In at least one embodiment, at least a template of the provided infrastructure configurations in step 302 may be compared to the infrastructure configurations at the timepoints to determine the changes.

For example, the method 300 includes automatically generating (306) different infrastructure code for an infrastructure configuration at different timepoints. The different infrastructure code may be based at least in part on changes in the infrastructure configurations occurring at different timepoints. In at least one embodiment, the automatic generating (306) may occur as an outcome of the determination (304) of the infrastructure configurations, such as based in part on a scan or a notification from the DRS agent or a serverless compute function of the DRS. Further, based in part on an IaC template of step 306, a determination (308) may be made about the changes itself by a comparison to a stored IaC template. For example, the infrastructure configuration may be related to network configuration changes, where individual ones of the different infrastructure code are for different ones of the infrastructure configurations. The method 300 includes initiating (310) a second VPC at a different geographical location than the first VPC, this may be by performing the replication phase or initiating the recovery phase, as described with respect to FIGS. 1 and 2. These phases may include transmitting one of the different infrastructure code to the second geographical location. The second VPC is to perform an application that may be performed or intended to be performed in the first VPC.

The method 300 includes executing (312) one of the different infrastructure code for the second VPC. This can cause deployment of one of the infrastructure configurations to enable the application within the second VPC. For example, the network configuration of the second VPC may be enabled by executing a YAML® or JSON® template using an IaC resource stack module. Further, templates associated with the instances previously in the first VPC may be caused in the second VPC. There may be adjustments to the instances to enable the network configuration of the second VPC to function as intended. Further, even though step 310 is illustrated to follow step 308, a skilled artisan reviewing the disclosure described herein would appreciate that the changes realized in step 308 allow for the IaC template to be stored with a timepoint and that the initiation (310) of the second VPC can occur at a later time. In addition, it is also possible to automatically generate (306) the IaC template upon a change determined or notified to the DRS after the determination step 304.

In at least one embodiment, the infrastructure configurations of the method 300 includes, other than network configuration, subnet Classless Inter-Domain Routing (CIDR), firewall rules, route tables, Internet gateway configuration, network address translation (NAT) configuration, network access control lists (ACLs), performance characteristics of created volumes associated with the infrastructure configurations of the first VPC, prefix list, and instance resource usage.

In at least one embodiment, the method 300 is a computer-implemented method that includes a further step or includes a sub-step for providing the infrastructure configurations using physical infrastructure, such as source servers, at an on-premises location as a primary geographical location. In at least one embodiment, the method 300 includes determining a requirement to move the infrastructure configurations to the different geographical location. For example, a hazard or other event causing a virtual or physical alteration in a first geographical location having the first VPC may require fallback or flip to a second VPC.

In at least one embodiment, the method 300 is a computer-implemented method that includes a further step or includes a sub-step for causing the initiation of the second VPC at the different geographical location based in part on the requirement to move the infrastructure configurations. Further, the method 300 may determine changes in the first VPC by periodically scanning the infrastructure configurations for the changes. Based in part on the changes, the method 300 includes performing the automatic generation of the different infrastructure code to provide IaC files that are template files in YAML®, JSON®, or other suitable format, to be retained in a reserve geographical location. In at least one embodiment, the reserve geographical location is distinct than the geographical locations of the second VPC and of the first VPC. For example, a user may retain a template on their computer that is distinct from the resources in the geographical locations available for the VPCs.

In at least one embodiment, the method 300 is a computer-implemented method that includes a further step or includes a sub-step for automatically generating a first infrastructure code upon deployment of the first VPC having the infrastructure configurations. This allows a distinct feature of the system for cross-regional disaster recovery, such as a DRS, to separately generate a template than a template executed to provide the first VPC, for instance.

In at least one embodiment, the method 300 is a computer-implemented method that includes a further step or includes a sub-step for determining the changes based in part on a notification received to a service, such as a DRS, that retains the first infrastructure code. The method 300 includes performing the automatic generation of the different infrastructure code by applying at least one of the changes to the first infrastructure code.

In at least one embodiment, the method 300 is a computer-implemented method that includes a further step or includes a sub-step for enabling administrator access to a service comprising the different infrastructure code. The method 300 includes receiving administrator changes to at least one of the different infrastructure code. This allows for customizing of the automatically generated template, such as to add further changes intended for the infrastructure configuration in the second VPC. The method 300 includes performing the execution of the one of the different infrastructure code, within the second VPC, with the administrator changes applied.

In at least one embodiment, the method 300 is a computer-implemented method that includes a further step or includes a sub-step for enabling an interface to allow administrator selection of one of the different infrastructure code based in part on one of the different timepoints. For example, an administrator may choose a different timepoint than an immediate past timepoint to recover or to which to flip for the template of the second VPC. The method 300 includes enabling an interface to allow administrator selection of at least one of the different infrastructure code based in part on one of the infrastructure configurations of one of the different timepoints. This may be by a CLI or GUI on a client device of the administrator that is a front-end to the DRS, for instance.

In at least one embodiment, the method 300 is a computer-implemented method that includes a further step or includes a sub-step for enabling an interface, such as the CLI or GUI, to allow administrator selection of one or more of the different infrastructure code. The method 300 includes exporting the selection of the one or more of the different infrastructure code, as a file, to a client device for storage, edit, or deployment to the second VPC. The method 300 includes determining a disaster in a primary geographical location associated with the first VPC.

In at least one embodiment, the method 300 includes enabling a service, such as a DRS, to create a copy of at least one instance attribute that is outside a scope of the infrastructure configurations associated with the first VPC. In at least one embodiment, this may be a copy of a launch template that is distinct from the IaC template. The method 300 includes retrieving at least one of the different infrastructure code for the second VPC that is an IaC template, in addition to the launch template. The method 300 includes automatically adjusting the at least one of the different infrastructure code based in part on the at least one instance attribute prior to causing the deployment of the one of the infrastructure configurations. In at least one embodiment, the at least one instance attribute is associated with security groups or volume types to be used with the one of the infrastructure configurations.

Figure 4:
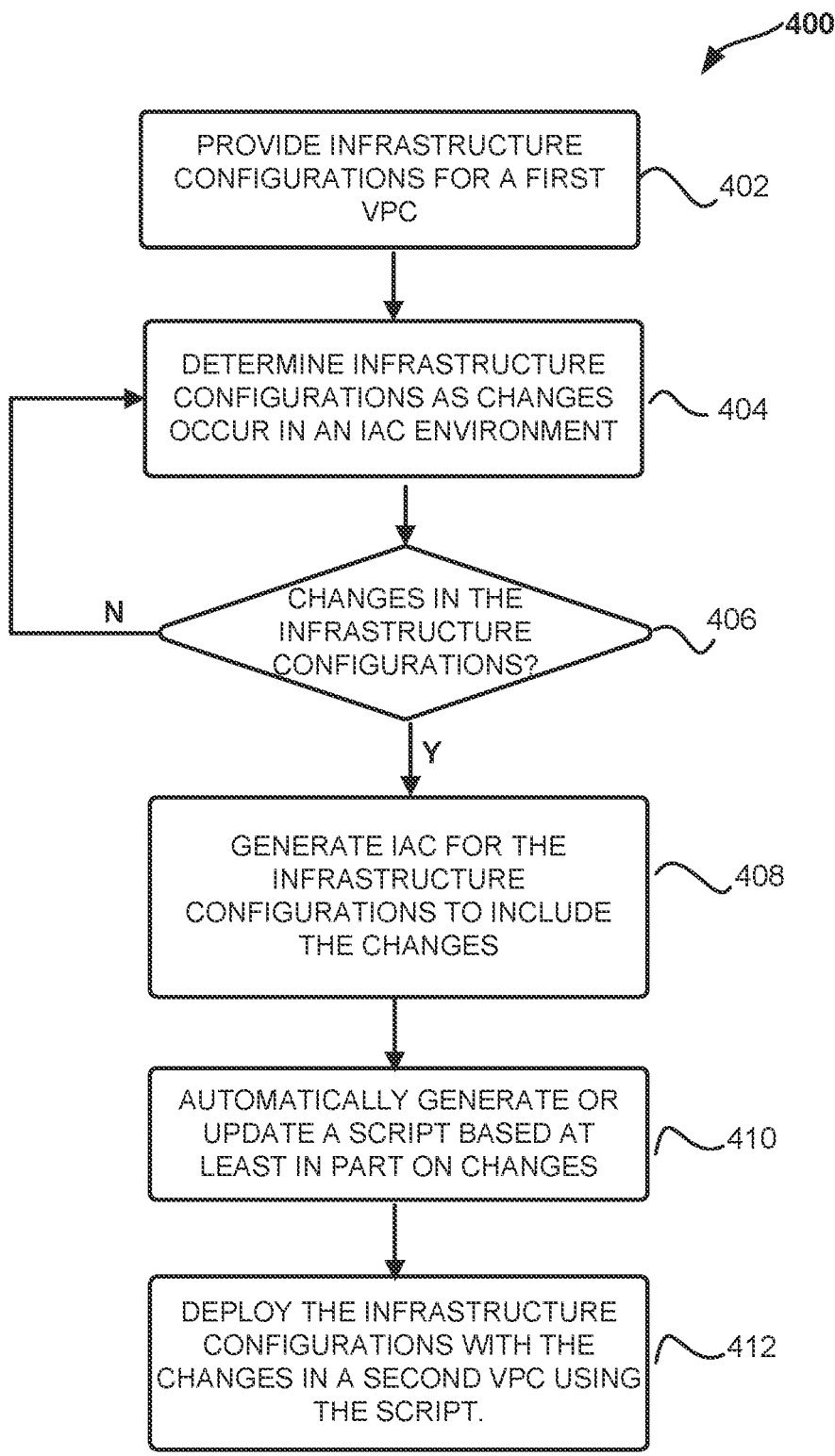
FIG. 4 illustrates another process flow or method used for a system for cross-regional disaster recovery, in accordance with at least one embodiment.

FIG. 4 illustrates another process flow or method 400 used for a system for cross-regional disaster recovery, in accordance with at least one embodiment. One or more steps in the method 400 may be performed on a client device or using a client device together with a cloud environment that is remote from the client device, as illustrated and described with respect to FIGS. 5-7. The method 400 includes providing (402) infrastructure configurations for a first VPC. This may be by using a default IaC template or generating a customized IaC template from a default template, using an IaC resource stack module. The template may be a YAML® or JSON® format file or document that may be compiled in an appropriate YAML® or JSON® compiler of the IaC framework or environment, prior to execution in the IaC framework or environment to cause underlying servers to be provided for deploying the first VPC.

The method 400 includes scanning and reading infrastructure configurations over periods of timepoints to determine (404) infrastructure configurations associated with an application to be deployed using the IaC framework or environment. The scanning and reading occur over the timepoints and may be associated with any changes that may occur over the timepoints. The method 400 includes verifying (406) that changes have occurred. In at least one embodiment, at least a template of the provided infrastructure configurations in step 402 may be compared to the infrastructure configurations at the timepoints to determine the changes.

The method 400 includes generating (408) infrastructure code for the infrastructure configurations to be deployed with a first VPC. The method 400 further includes automatically generating or updating (410) a script based at least in part on changes in the infrastructure code. For example, the script may be a YAML® or JSON® script that is to be used to deploy (412) a version of the infrastructure configurations with the changes in a second VPC of a different geographical location than associated with the first VPC. In at least one embodiment, the automatically generated or updated script may be based in part on the template having the infrastructure code that is updated to reflect the changes in the infrastructure configuration as deployed in the first VPC.

In at least one embodiment, the infrastructure configurations in the method 400 includes fail-over ordering and the script that is automatically generated or updated includes a version of the fail-over ordering. This allows for selection of an appropriate geographical location, a zone, or other characteristics for deploying the second VPC. In at least one embodiment, the method 400 is a computer-implemented method that includes a further step or includes a sub-step for receiving application code for the application that is to be deployed in the second VPC. The infrastructure configurations of the infrastructure code may be restricted to the application. This allows the different VPCs to support different applications and the systems described herein supports deployment of the application alone while handling the underlying resources in an automated manner.

In at least one embodiment, the method 400 is a computer-implemented method that includes a further step or includes a sub-step for determining a template associated with different infrastructure configurations to be used with the application. Then, the method 400 includes providing customizations to the template to generate the infrastructure code. For example, the template is a default template that may be modified using the customizations to change resources and to change recovery mechanisms associated with the infrastructure configurations of the first VPC.

In at least one embodiment, the method 400 is a computer-implemented method that includes a further step or includes a sub-step for generating a client-side companion library along with the infrastructure code. The client-side companion library may be an artifact of the infrastructure code and can include at least a definition that is associated with a primary geographical location that hosts the physical resources for the first VPC. Moreover, the definition includes at least a security parameter defining security to be associated with configuration variables and traffic for the first VPC. In addition, the definition may include at least a scalable domain name system (DNS) for the first VPC. This allows for auto-scaling where available, whereas the security parameter allows for recovery and replication by the DRS on behalf of the customer or administrator.

In at least one embodiment, the method 400 is a computer-implemented method that includes a further step or includes a sub-step for determining a first security credential for the first VPC from the definition. Further, the first security credential may be associated with the primary geographical location. In at least one embodiment, the method 400 is a computer-implemented method that includes a further step or includes a sub-step for causing the deployment of the infrastructure configurations in the first VPC by executing the infrastructure code to select from the physical resources of the primary geographical location using the security credential. Further, the method 400 includes enabling, using the script, a fail-over change from the first VPC to the second VPC of the different geographical location. The version of the infrastructure configurations in the second VPC use a different security credential than the first security credential.

In doing so, the method 400 includes providing permissions that are not only region and account centric as in IAM security. Certain policies of the DRS can allow other abstractions based on resources. For example, application-aware permissions, other than in IAM, allow administrators and customers to manage access to resources of the first and second VPC by assuming roles in other accounts, on behalf of which to perform actions for the resources. In at least one embodiment, to assume a role and account for access to resources on behalf of a user, a customer or administrator knows an "active" geographical location for the resources, so that reads and/or writes are properly routed, using specific credentials for the geographical location that is different for other geographical location. This information can be packaged in the client-side companion library. For example, the client-side companion library can be used to determine which region is primary (based on a contract; such as on a parameter table or a routing table) to determine the credential to return with for traffic of an associated geographical location.

In at least one embodiment, the method 400 is a computer-implemented method that includes a further step or includes a sub-step for initiating, by the script and as part of a fail-over from a primary geographical location to the different geographical location, a parameter table, and a routing table to be replicated and located in the different geographical location. The method 400 includes causing, using the parameter table, the version of the infrastructure configurations to be deployed in the second VPC of the different geographical location. The method 400 includes enabling, using the routing table, traffic previously received to the first VPC to be routed in the second VPC. Here, the traffic may include security credentials associated with the second VPC upon completion of the fail-over. The security credentials are generated, in part, from a version of the infrastructure code executed in the second VPC.

In at least one embodiment, the method 400 is a computer-implemented method that includes a further step or includes a sub-step for generating, as part of the script, at least one parameter table and at least one routing table to be used with the second VPC of the different geographical location. Further, the method 400 includes generating, as part of the script, an order of multiple geographical locations for the second VPC and associated parameter tables and routing tables to be used with respective ones of the multiple geographical locations.

In at least one embodiment, such a method 300, 400 performed using one or more aspects in the systems in FIGS. 1 and 2 allow customers or administrators to build resilient workloads either directly as to the IaC framework or environment described herein or for an application that causes the underlying IaC framework or environment to be applied. In the event of a regional outage, challenges associated with configuring cross-regional infrastructure, such as with respect to tooling and abstractions provided by web-service providers associated with the customer or administrator, are no longer the case. While customers having advanced knowledge of formats may be able to distinctly apply cross-regional applications, the method 300, 400 performed using one or more aspects in the systems in FIGS. 1 and 2 address these challenges by standard format offered in the automatically generated templates and scripts described herein.

The IaC framework or environment described herein for deploying resilient applications, provides high-level code constructs in the templates to build cross-regional applications, where the abstractions will provide customers with the ability to build state that correctly replicates to another geographical locations. As a web service provider may be able to operate in geographical isolation from each other for high fault tolerance between regions, the web service provider should be able to use standard format templates and adjustments thereto to deploy their workloads to any geographical regions without concerns to local formats.

In an example, different geographies encourage isolation or may have different regional requirements where cross-region applications are difficult to transfer. There may be a burden associated with transferring aspects of the infrastructure configuration to interact in a way that will provide a customer or administrator with an ability to flip between geographical locations, in a cost-effective manner, such as when an outage occurs in one geographical region. Further, configuring a fail-over or fallback without detailed infrastructure knowledge may hamper disaster recovery. Instead of requiring customers or administrators to build cross-region workflows in the form of Disaster Recovery (DR) Runbooks, which must be performed frequently so that it is up to date, the approaches described herein provide cross-regional disaster recovery using automatically generated or updated scripts based in part on continuous scanning and using secure credentials that are distinct across different geographical locations.

The IaC framework or environment described herein allows a customer or administrator to use high levels of abstraction to define a cross-region application that may be either active-active or active-passive. The active-passive approach allows a customer or administrator to explicitly flip to a backup geographical location when needed. For example, an active-passive approach enables a customer or administrator to have the infrastructure configuration in place in a primary and a secondary geographical location to perform a flip. Further, a mechanism that will perform the flip is described using the systems and method of FIGS. 1-4, when the customer or administrator chooses to perform the flip.

In at least one embodiment, even if a customer or administrator has a secondary geographical location or a runbook, performing a flip of production servers from a primary geographical location to a secondary geographical location could cause loss of data or configurations and can only happen at a time of a disaster when emergency procedures are in effect. However, using the automated code and scripts described herein, a customer or administrator can perform a flip using the IaC framework or environment described herein that already has intimate knowledge of the underlying resources and cause automation in the flip procedure. Specifically, the abstractions in the IaC framework or environment include customizations by a customer or administrator that then defines a behavior for the flip. In at least one embodiment, the IaC framework or environment described herein allows compiling of all the provided codes to form a single automated script or button. For example, the script is a dedicated fail-over serverless compute function that is represented in the GUI as a button. The button is clickable to cause a flip to a secondary geographical location. Further, the script is kept up to date with the IaC changes by virtue of it being part of the IaC framework or environment. In at least one embodiment, the method and system in FIGS. 1-4 reduce the operational burden of maintaining a cross-regional application, as a result.

In at least one embodiment, the IaC framework or environment wraps a cloud development kit (CDK) and allows for the CDK commands to work seamlessly within the framework by standardizing the commands across geographical locations. For example, the code in the templates and the scripts of the serverless compute functions are high level abstractions that are recognized and processed by the underlying IaC frameworks or environments in the different geographical locations irrespective of specific hardware and resource configurations of the underlying source servers.

In at least one embodiment, a routing tables are globally provided for deploying the cross-regional disaster recovery described herein, where the routing tables can provide the replication desired to different geographical locations for changes in the infrastructure configuration of a primary VPC. The replicating occurs automatically across the regions and may use a transit gateway based peering connection between the geographical locations. In at least one embodiment, the IaC framework or environment relies on sweeping actions of one or more modules to perform updates across different geographical locations. For example, parameter tables and routing tables in the IaC framework or environment may be copied over as part of the IaC framework or environment to secondary geographical locations. The same may be performed for IaC templates and also for launch templates. Thereafter, the script that is represented by a serverless compute function may be used to trigger the flip and also may be used to cause deployment of infrastructure configurations in the secondary geographical locations using the parameter tables, routing tables, and the templates.

Figure 5:
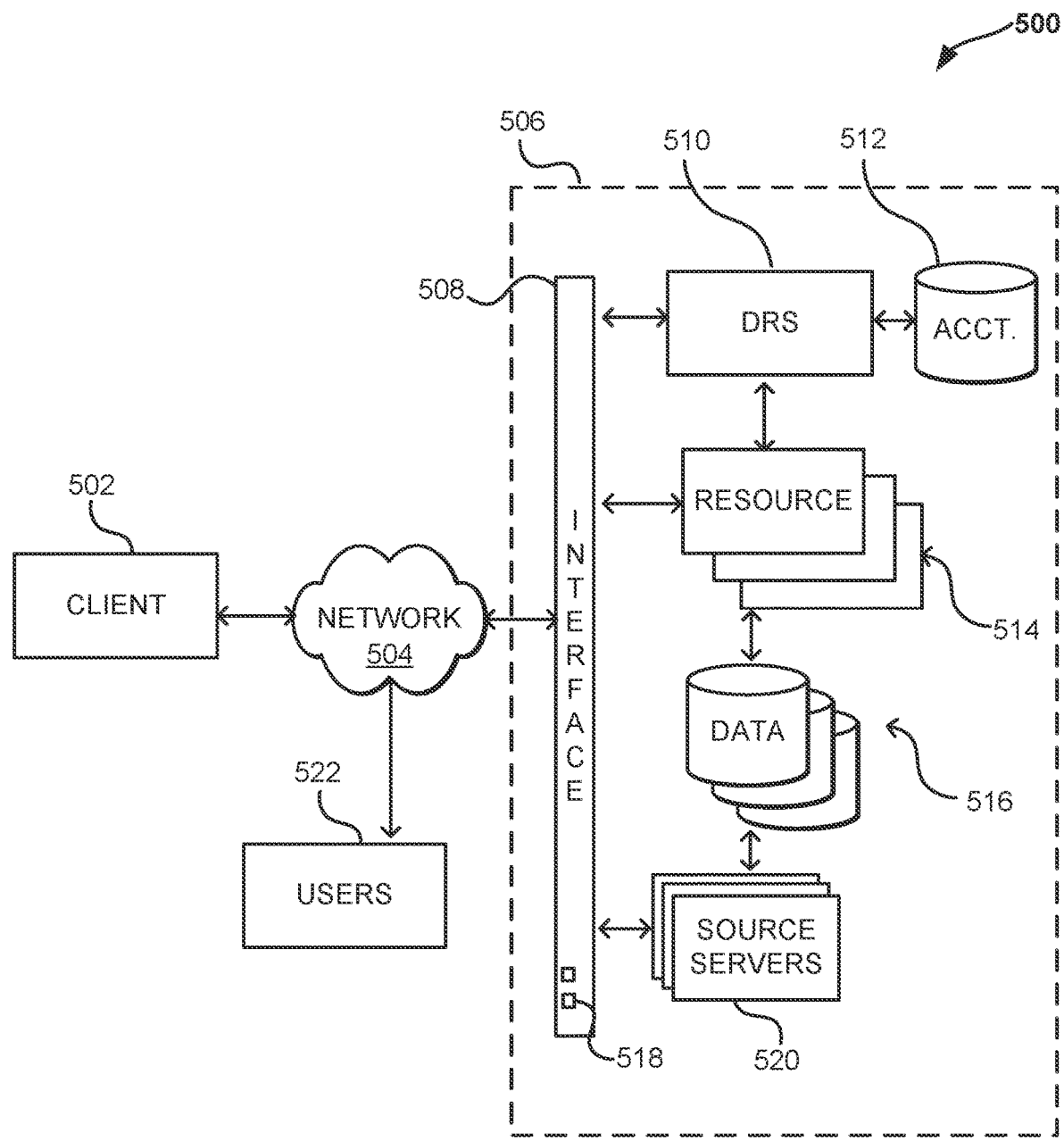
FIG. 5 illustrates an example network-inclusive computing environment in which aspects of various embodiments can be implemented.

FIG. 5 illustrates an example environment 500 in which aspect of various embodiments can be implemented. Such an environment can be used in some embodiments to provide source servers for one or more customers or administrators of a resource provider, as part of a shared or multi-tenant resource environment. Therefore, a similar environment 500 may be in different geographical locations to enable disaster recovery using one or more of such different geographical locations and the resources within their respective environments. For example, the provider environment 506 can be a cloud environment that can be used to provide cloud-based network connectivity for users, as may be used during disaster recovery. The resources may also provide networking functionality for one or more client devices 502, such as personal computers, that may be able to connect to one or more networks 504 as discussed herein.

In this example a customer or administrator is able to utilize a client device 102/502 to submit requests across at least one network 504 to a service provider environment 506 that may include the DRS 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The service provider environment 506 can include any appropriate components for receiving requests and returning information or performing actions in response to those requests. As an example, the service provider environment might include Web servers and/or application servers for receiving and processing requests, then returning data, Web pages, video, audio, or other such content or information in response to the request. The service provider environment can be secured such that only authorized users have permission to access those resources.

In various embodiments, a service provider environment 506 may include various types of resources that can be utilized by multiple users for a variety of different purposes. As used herein, computing, and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the service provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a customer or administrator wanting to utilize a portion of the resources 514 can submit a request that is received to an interface layer 508 of the service provider environment 506. The interface layer can include application programming interfaces (APIs) or other exposed interfaces 518 enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager or other such system, service, or component configured to manage customer accounts and information, resource provisioning and usage, and other such aspects. A resource manager, of the example environment 500, receiving the request can perform tasks such as to authenticate an identity of the customer or administrator submitting the request, as well as to determine whether there is an existing account with the resource provider, where the account data may be stored in at least one data store 512 in the provider environment.

A customer or administrator can provide any of various types of credentials in order to authenticate an identity of the user to the provider. These credentials can include, for example, a username and password pair, biometric data, a digital signature, or other such information. The provider can validate this information against information stored for the customer or administrator. If a customer or administrator has an account with the appropriate permissions, status, etc., the resource manager can determine whether there are adequate resources available to suit the administrator's request, and if so, can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the customer or administrator does not have a valid account with the provider, the account does not enable access to the type of resources specified in the request, or another such reason is preventing the customer or administrator from obtaining access to such resources, a communication can be sent to the customer or administrator to enable the user to create or modify an account, or change the resources specified in the request, among other such options.

In at least one embodiment, resources made available for use by a client device 502 can include servers and other resources 510, 520, each having at least one processor and memory. The memory includes instructions that when executed by the respective processors enable one or more of the modules and the stores 116-128 in FIGS. 1, 2, described herein, to provide computing instances for performing an application. The servers support a serverless compute service module 104 that may be used to cause application programming interfaces (API) calls to one or more other modules of the service provider environment 506 or to perform one or more functions of the IaC framework or environment without an API call. In at least one embodiment, the serverless compute service module 104 may be part of a DRS 106 within the service provider environment 506. The DRS 106 may be unique to each customer or administrator account and may be accessed by the customer or administrator from a client device 102/502 using a command line interface (CLI) or a character user interface (GUI) 130. Further, the CLI or GUI may be associated with a DRS 106 but may be provided by a front-end resource than an application within the DRS 106. The customer or administrator provides a service or an application for users (on respective host machines) 522 using one or more of the modules or stores 116-128 of the service provider environment 506.

Once a customer or administrator (or other requestor) is authenticated, the account verified, and the resources allocated, the customer or administrator can utilize the allocated resource(s) in form of a VPC for the specified capacity, amount of data transfer, period of time, or other such value. In at least some embodiments, a customer or administrator might provide a session token or other such credentials with subsequent requests in order to enable those requests to be processed on that session. The customer or administrator can receive a resource identity, specific address, or other such information that can enable the client device 502 to communicate with an allocated resource without having to communicate with the resource manager, at least until such time as a relevant aspect of the account changes, the customer or administrator is no longer granted access to the resource, or another such aspect changes.

A DRS 510 may be associated with a resource manager for disaster recovery purposes in this example and can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally facing user APIs. The interface layer can be responsible for Web service front end features such as authenticating users or administrators based on credentials, authorizing the users or administrators, throttling requests to the API servers, validating input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, administrators or users of the services provided herein. The servers of the Web services layer can be stateless and scaled horizontally as known in the art. API servers, as well as the persistent data store, can be spread across multiple data centers in a region, for example, such that the servers are resilient to single data center failures.

Figure 6:
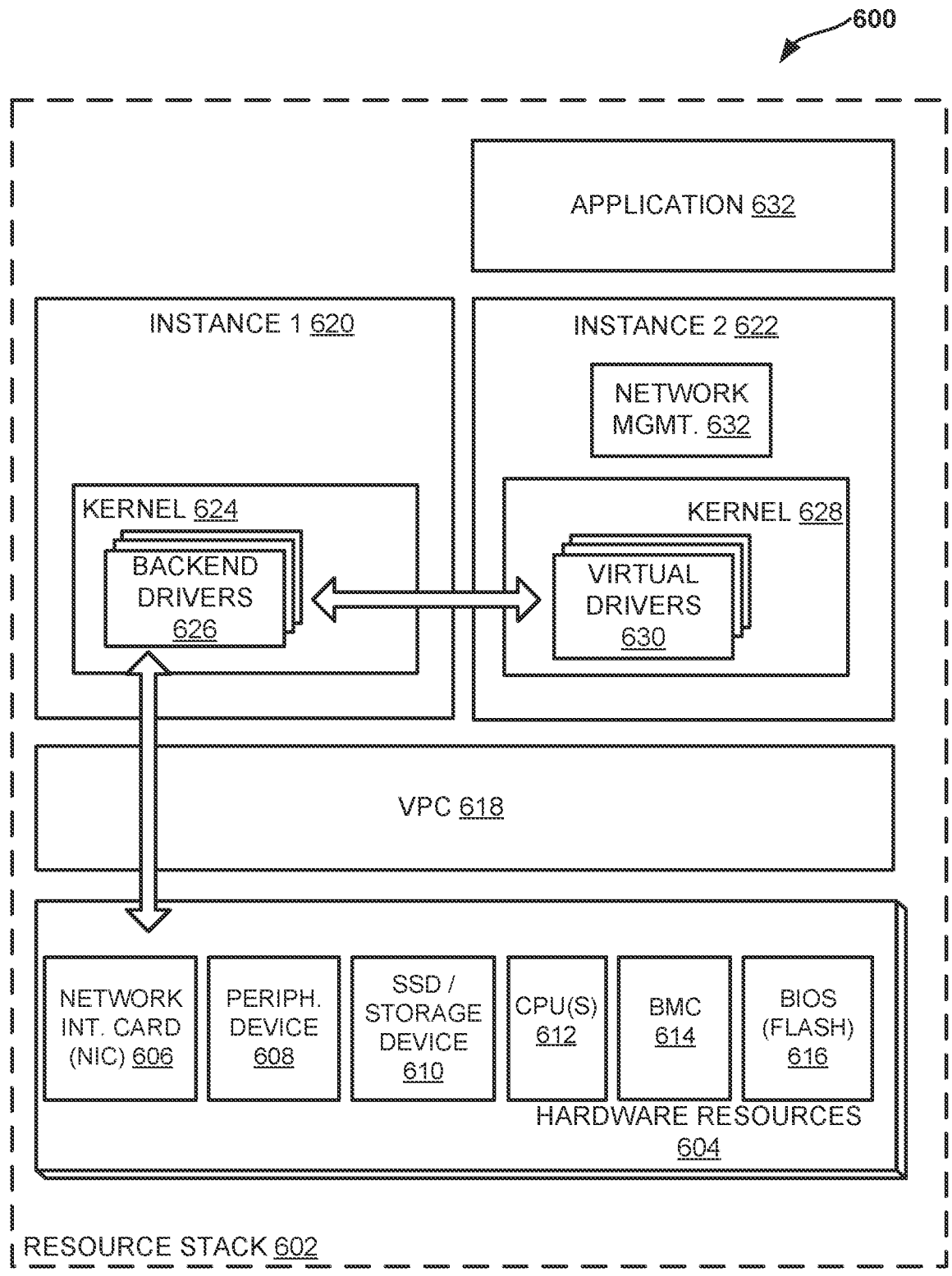
FIG. 6 illustrates example components of a server that can be utilized to perform at least a portion of a cross-regional disaster recovery process, in accordance with various embodiments.

FIG. 6 illustrates an example resource stack 602 of virtual and physical resources 600 that can be utilized in accordance with various embodiments, such as may be provided as part of an IaC framework or environment for cross-regional disaster recovery, such as illustrated in FIGS. 1 and 2. Tasks, such as disaster recovery-related tasks for an application 632, for example, may be performed in a VPC 618 and performed for one or more instances 620, 622 of the VPC 618. The resource stack 602 includes physical underlying resources, such as CPUs 612 for executing code to perform these tasks, NIC 606 for communicating network traffic, and memory for storing instructions and networking data. In some embodiments, an entire machine may be allocated for these tasks, or only a portion of the machine, such as to allocate a portion of the resources as a virtual resource in an instance 620; 622 that can perform at least some of these tasks.

Such a resource stack 602 can be used to provide an allocated environment for an administrator (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, a baseboard management controller (BMC) 614, and the like.

In at least one embodiment, the hardware resources 604 reside on a single computing device (e.g., chassis). In at least one embodiment, the hardware resources can reside on multiple devices, racks, chassis, and the like. Running on top of the hardware resources 604, a virtual resource stack may include a virtualization layer such as VPC 618, a first instance 620, and potentially also one or more instances 622 capable of executing at least one application 632. The VPC 618, if utilized for a virtualized environment, can manage execution of the one or more guest operating systems and allow multiple instances of different operating systems to share the underlying hardware resources 604.

An instance 620 or 622 can include one or more virtualized or para-virtualized drivers 630 and can include one or more backend device drivers 626. When the operating system (OS) kernel 628 of an instance wants to invoke an I/O operation, the virtualized driver 630 may perform the operation by way of communicating with the backend device driver 626. When the virtualized or para-virtualized drivers 630 wants to initiate an I/O operation (e.g., to send out a network packet), a kernel component can identify which physical memory buffer contains the packet (or other data) and the virtualized or para-virtualized drivers 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

In at least one embodiment, there will be portions of the physical resource 600 that will be inaccessible to the OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. Computing resources, such as servers, smartphones, or personal computers, will generally include at least a set of standard components configured for general purpose operation, although various proprietary components and configurations can be used as well within the scope of the various embodiments. As mentioned, this may include client devices for transmitting and receiving network communications, or servers for performing tasks such as network analysis and rerouting, among other such options.

Figure 7:
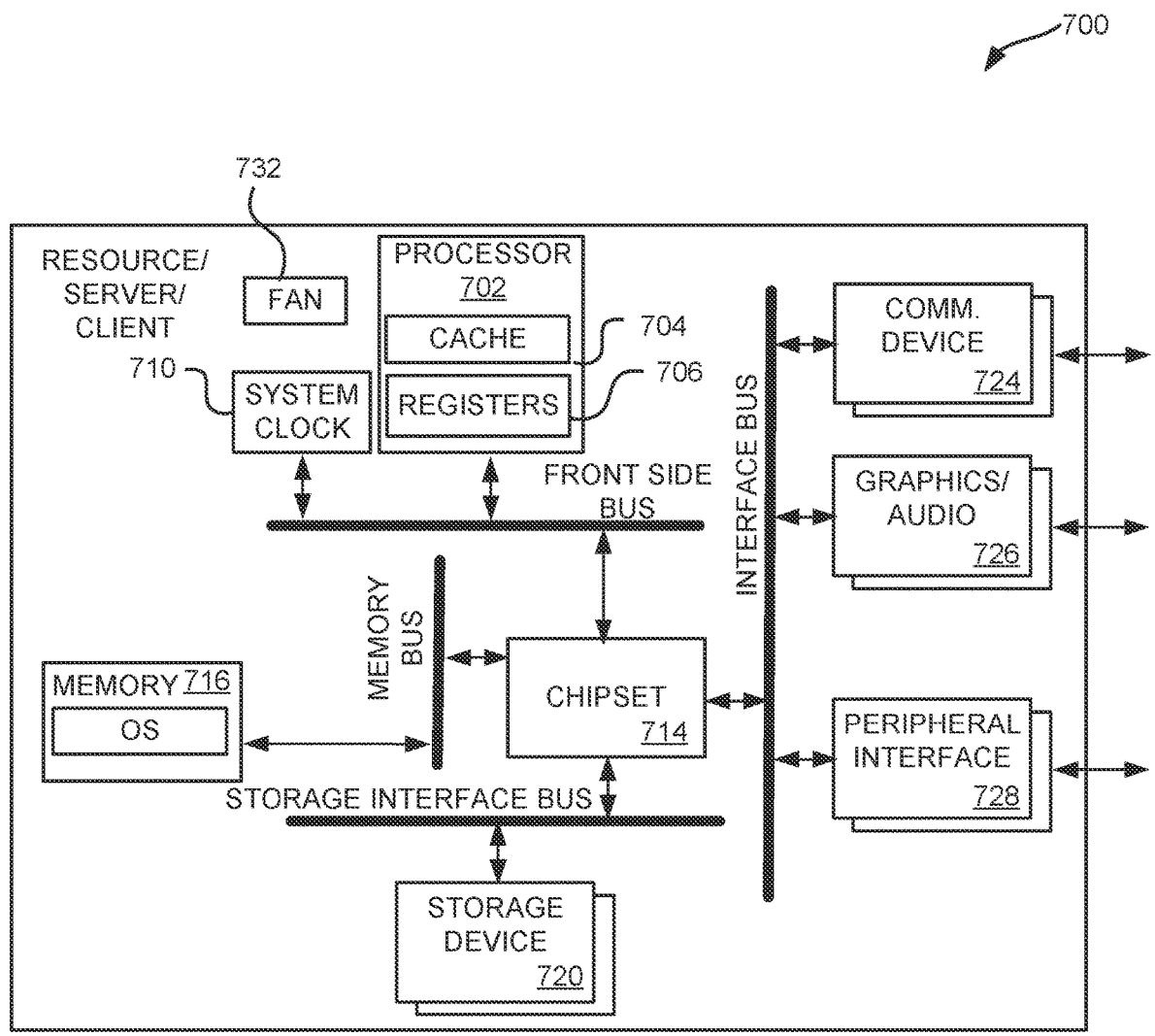
FIG. 7 illustrates example components of a computing device that can be used to implement monitoring and other aspects of various embodiments.

FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms.

A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form of physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory.

The processor 702 can also communicate with various other components via the chipset 714 and an interface bus (or graphics bus, etc.), where those components can include communications devices 724, such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, a data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices.

A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also, in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like.

In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML, or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update, or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer, or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
at least one processor and memory comprising instructions that when executed by the at least one processor causes the system to:
determine infrastructure configurations which are associated with a first virtual private cloud (VPC) and which have occurred at different timepoints;
automatically generate different infrastructure code for the different timepoints based at least in part on changes which have occurred in the infrastructure configurations at the different timepoints;
initiate a second VPC that is associated with a different geographical location than the first VPC;
execute one of the different infrastructure code for the second VPC to cause deployment of one of the infrastructure configurations; and
perform an application of the first VPC within the second VPC.

2. The system of claim 1, wherein the infrastructure configurations comprise network configuration, subnet Classless Inter-Domain Routing (CIDR), firewall rules, route tables, Internet gateway configuration, network address translation (NAT) configuration, network access control lists (ACLs), performance characteristics of created volumes associated with the infrastructure configurations of the first VPC, prefix list, and instance resource usage.

3. The system of claim 1, wherein the memory comprising the instructions that when executed by the at least one processor further causes the system to:
   provide the infrastructure configurations using physical infrastructure at an on-premises location as a primary geographical location;
   determine a requirement to move the infrastructure configurations to the different geographical location; and
   cause the initiation of the second VPC at the different geographical location based in part on the requirement to move the infrastructure configurations.

4. The system of claim 1, wherein the memory comprising the instructions that when executed by the at least one processor further causes the system to:
   periodically scan the infrastructure configurations for the changes; and
   perform the automatic generation of the different infrastructure code to provide infrastructure as code (IaC) files to be retained in a reserve geographical location than the different geographical location of the second VPC, or a primary geographical location of the first VPC.

5. The system of claim 1, wherein the memory comprising the instructions that when executed by the at least one processor further causes the system to:
   automatically generate a first infrastructure code upon deployment of the first VPC having the infrastructure configurations or based in part on an agent installed in the first VPC;
   determine the changes based in part on a notification received to a service that retains the first infrastructure code; and
   perform the automatic generation of the different infrastructure code by applying at least one of the changes to the first infrastructure code.

6. The system of claim 1, wherein the memory comprising the instructions that when executed by the at least one processor further causes the system to:
   enable administrator access to a service comprising the different infrastructure code;
   receive administrator changes to at least one of the different infrastructure code; and
   perform the execution of the one of the different infrastructure code, for the second VPC, with the administrator changes applied.

7. A computer-implemented method comprising:
   determining infrastructure configurations which are associated with a first virtual private cloud (VPC) and which have occurred at different timepoints;
   automatically generating different infrastructure code for an infrastructure configuration based at least in part on changes which have occurred in the infrastructure configurations occurring at different timepoints;
   initiating a second VPC at a different geographical location than the first VPC, the second VPC to perform an application of the first VPC;
   executing one of the different infrastructure code for the second VPC to cause deployment of one of the infrastructure configurations to enable the application within the second VPC.

8. The computer-implemented method of claim 7, wherein the infrastructure configurations comprise network configuration, subnet Classless Inter-Domain Routing (CIDR), firewall rules, route tables, Internet gateway configuration, network address translation (NAT) configuration, network access control lists (ACLs), performance characteristics of created volumes associated with the infrastructure configurations of the first VPC, prefix list, and instance resource usage.

9. The computer-implemented method of claim 7, further comprising:
   providing the infrastructure configurations using physical infrastructure at an on-premises location as a primary geographical location;
   determining a requirement to move the infrastructure configurations to the different geographical location; and
   causing the initiation of the second VPC at the different geographical location based in part on the requirement to move the infrastructure configurations.

10. The computer-implemented method of claim 7, further comprising:
    periodically scanning the infrastructure configurations for the changes; and
    performing the automatic generation of the different infrastructure code to provide infrastructure as code (IaC) files to be retained in a reserve geographical location than the different geographical location of the second VPC, or a primary geographical location of the first VPC.

11. The computer-implemented method of claim 7, further comprising:
    automatically generating a first infrastructure code upon deployment of the first VPC having the infrastructure configurations or based in part on an agent installed in the first VPC;
    determining the changes based in part on a notification received to a service that retains the first infrastructure code; and
    performing the automatic generation of the different infrastructure code by applying at least one of the changes to the first infrastructure code.

12. The computer-implemented method of claim 7, further comprising:
    enabling administrator access to a service comprising the different infrastructure code;
    receiving administrator changes to at least one of the different infrastructure code; and
    performing the execution of the one of the different infrastructure code, for the second VPC, with the administrator changes applied.

13. The computer-implemented method of claim 7, further comprising:
    enabling an interface to allow administrator selection of one of the different infrastructure code based in part on one of the different timepoints.

14. The computer-implemented method of claim 7, further comprising:
    enabling an interface to allow administrator selection of at least one of the different infrastructure code based in part on one of the infrastructure configurations of one of the different timepoints.

15. The computer-implemented method of claim 7, further comprising:
    enabling an interface to allow administrator selection of one or more of the different infrastructure code; and exporting the selection of the one or more of the different infrastructure code, as a file, to a host machine for storage, edit, or deployment to the second VPC.

16. The computer-implemented method of claim 7, further comprising:
   determining a disaster in a primary geographical location associated with the first VPC;
   enabling a service to create a copy of at least one instance attribute that is outside a scope of the infrastructure configurations associated with the first VPC; and
   retrieving at least one of the different infrastructure code for the second VPC; and
   automatically adjusting the at least one instance attribute based in part on the at least one of the different infrastructure code prior to causing the deployment of the one of the infrastructure configurations.

17. The computer-implemented method of claim 16, wherein the at least one instance attribute is associated with security groups or volume types to be used with the one of the infrastructure configurations.

18. A non-transitory computer-storage medium storing instructions configured to instruct at least one computing device to:
   determine infrastructure configurations which are associated with a first virtual private cloud (VPC) and which have occurred at different timepoints;
   automatically generate different infrastructure code for an infrastructure configuration based at least in part on changes which have occurred in the infrastructure configurations occurring at different timepoints;
   initiate a second VPC at a different geographical location than the first VPC, the second VPC to perform an application of the first VPC;
   execute one of the different infrastructure code for the second VPC to cause deployment of one of the infrastructure configurations to enable the application within the second VPC.

19. The non-transitory computer-storage medium of claim 18, wherein the instructions configured to instruct at least one computing device further to:
   automatically generate a first infrastructure code upon deployment of the first VPC having the infrastructure configurations or based in part on an agent installed in the first VPC;
   determine the changes based in part on a notification received to a service that retains the first infrastructure code; and
   perform the automatic generation of the different infrastructure code by applying at least one of the changes to the first infrastructure code.

20. The non-transitory computer-storage medium of claim 18, wherein the instructions configured to instruct at least one computing device further to:
   enable administrator access to a service comprising the different infrastructure code;
   receive administrator changes, notifications, or scanned changes, as part of the changes to the infrastructure configurations; and
   performing the automatic generation of the different infrastructure code based in part on the administrator changes, notifications, or scanned changes.

* * * * *